July 11, 1944.  W. J. BIGLEY, JR  2,353,122
TANK
Original Filed Dec. 31, 1941
Fig. 1.
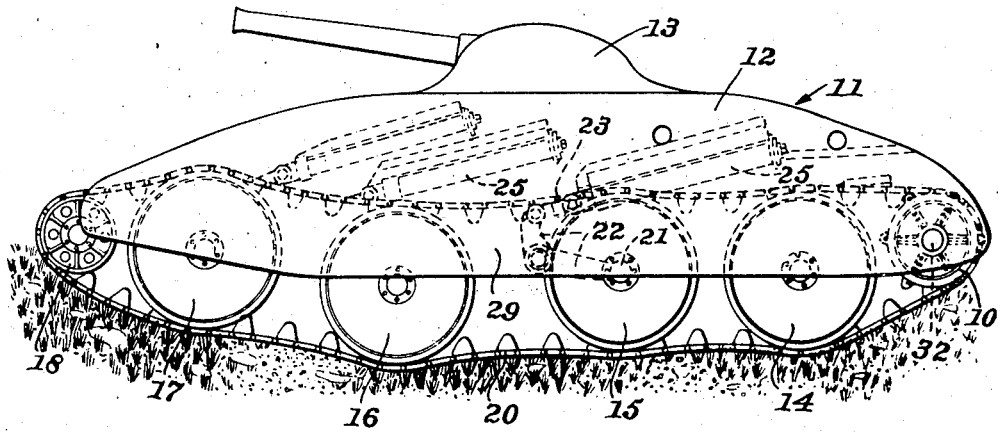
Fig. 2.
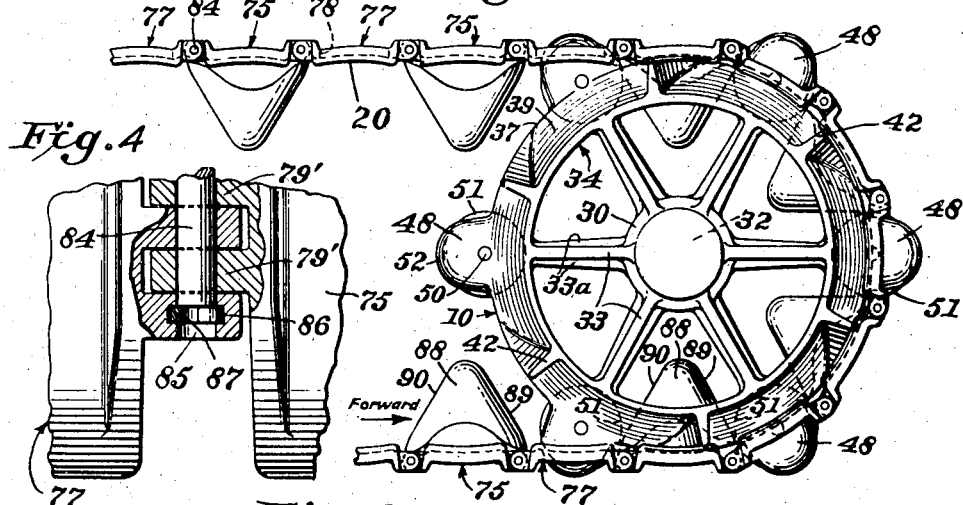
Fig. 4
Fig. 3.
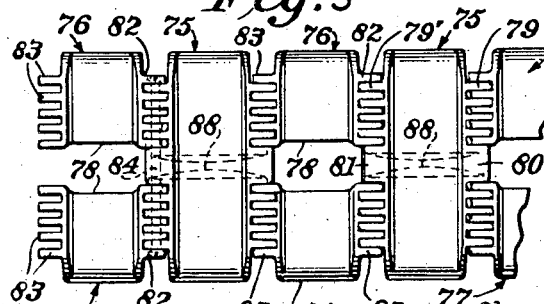
Fig. 5
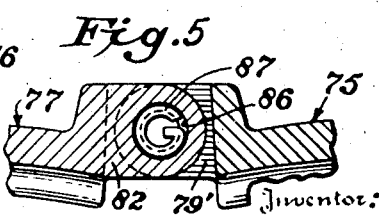
Inventor:
William J. Bigley, Jr.

Patented July 11, 1944

2,353,122

UNITED STATES PATENT OFFICE 2,353,122

TANK

William J. Bigley, Jr., Weehawken, N. J.

Original application December 31, 1941, Serial No. 425,216. Divided and this application March 10, 1943, Serial No. 478,730

5 Claims. (Cl. 305—10)

This application is a division of my copending application, Serial No. 425,216, filed December 31, 1941, for improvements in a tank.

The invention of the present application relates to new and improved tank or tractor structures, and more particularly, to improvements in the tracks therefor.

A primary object of the invention is to provide track constructions that will have longer lives and better wearing properties than corresponding devices of the prior art.

Another object of paramount importance is to provide a track capable of operation at extremely high-speeds, without any danger of break down or damage to the structure or to the occupants of the vehicle. Tanks equipped with devices of the present invention have been operated satisfactorily, during tests under extremely adverse conditions, at speeds well in excess of sixty miles per hour.

A further object of the invention is to provide novel guiding means associated with the track and sprocket, to prevent the track from becoming dislodged or accidentally removed from its normal, trained relation about the sprocket wheel and other wheels of the vehicle.

Still another object of the invention is to provide novel connecting means for the articulated links of the track and to provide improved means for preventing removal of the connecting means. To this end, the invention provides means for positively preventing removal of the track section connecting pins, even though the latter become broken intermediate their ends, yet permitting ready removal and replacement of the pins by an operator whenever desired, using simple, standard tools.

Other and further objects and advantages of the invention will be apparent to those skilled in the art, from a consideration of the following description of certain specific embodiments of the invention, shown in the accompanying drawing, in which:

Figure 1 is a somewhat diagrammatic side elevation of a tank of the type with which the present invention may be used;

Figure 2 is an elevation of a preferred form of sprocket wheel and articulated track;

Figure 3 is a plan view of the ground engaging surface of the tractor track;

Figure 4 is a similar fragmentary view, on an enlarged scale, with certain parts shown in section; and Figure 5 is a transverse section through the pin securing means shown in Figure 4.

Although not confined to such use, the sprocket of the present invention may be employed, as indicated at 10 in Figure 1, as the driving sprocket for a tank 11 having an armoured body 12, a gun turret 13, a plurality of independently sprung wheels 14, 15, 16, 17 and a guiding sprocket 18, about which the track 20 is trained. The wheels 14—17 are preferably provided with pairs of solid rubber tires, spaced apart to provide an annular guiding channel for the reception of fins associated with the track, as hereinafter explained. These wheels are preferably journalled on stub axles 21 carried by independently mounted bell crank levers 22 connected to links 23 having their ends connected to heavy coil springs housed in cylinders 25 mounted on the side walls of the tank between the inner wall thereof and an outer armoured skirt 29. Since the structures and arrangements of these parts are not claimed in this application, they are not shown in detail in the accompanying drawing and need not be described further.

Referring to Figure 2, the driving sprocket 10 comprises a hub 30 having a splined inner periphery (not shown) adapted to be mounted upon a correspondingly splined portion of the main drive shaft 32 of the vehicle. Spokes 33 radiate from the hub 30 and are connected, preferably integrally, at their outer ends to a circumferentially slotted rim comprising two annular members 34, as is more clearly shown in my parent application, identified above.

The rim on both sides of the slot is shaped to provide relatively narrow cylindrical surfaces 37 and radially inwardly and laterally inclined surfaces 39, similar to truncated cones and extending from the central circumferential area to the side edge faces of the rim. Preferably, the inclination of the surfaces 39 is substantially 45° from a plane normal to the wheel axis. These inclined surfaces are of importance, in preventing stones or other foreign bodies from becoming jammed between the sprocket and the adjacent faces of the track sections, as explained below.

The sprocket wheel also comprises a plurality of wings 42 projecting radially outwardly from the inclined surfaces 39 in circumferentially spaced relation, with their outer edges disposed in alignment with the central circumferential portions 37 or, in other words, substantially on an axial projection of the radially outermost edges of the inclined surfaces 39. Also, the wings 42 are preferably inclined rearwardly with respect to the normal direction of rotation of the sprocket and are disposed in equal angular relation to a central plane normal to the wheel axis.

These wings perform an important dual function, in that they provide lateral support for certain of the track links, as hereinafter explained, and act as chopping blades to dislodge dirt, mud, stones or other foreign bodies that tend to collect on the adjacent surface of the track links.

The wings 42, 43 preferably comprise triangular elements which may be integral with the rim or secured thereto as by welding. The spokes 33 preferably have associated therewith, strengthening or stiffening ribs 33a, and are preferably formed integrally with the rim and hub, to provide a sturdy, rigid, unitary structure.

The rim sections 34 further comprise a plurality of substantially radially projecting bosses 48, arranged in pairs on opposite sides of the central, circumferential slot and spaced circumferentially around the rim, between the pairs of wings 42. Each pair of bosses is apertured for the reception of a stub axle or pin 50, upon which an anti-friction roller 51 is journaled. Preferably, the bosses extend outwardly as at 52 beyond the periphery of the rollers, but are narrower than the rollers to expose the latter at areas adjacent the periphery of the sprocket.

As pointed out in the aforesaid parent application, it should be noted that the slot between the two rim sections is laterally enlarged at the spaces between the pairs of outwardly projecting bosses 48, by bevelling the inner walls of the rim sections in order to more readily receive the guiding fins on the track, as hereinafter explained.

Referring to Figures 2-5, the track of the present invention comprises a plurality of interconnected, articulated links arranged in a repeating cycle consisting of transversely elongated full width sections 75 and pairs of relatively narrow spaced apart sections 76, 77, the latter sections leaving central apertures 78. The sections 75 are provided with a plurality of sets of relatively narrow, forwardly and rearwardly projecting apertured bosses 79, 79' on their corresponding front and rear edges. Also, they have centrally positioned, relatively wide forwardly and rearwardly projecting apertured bosses 80, 81. Each of the narrow intermediate sections 77, 76 has a set of forwardly and rearwardly projecting bosses 82, 83, staggered with respect to the bosses on the sections 75 and disposed adjacent thereto in the spaces therebetween. The sections are interconnected by hinge pins 84 extending through the apertures in the respective bosses, as indicated in Figure 4. Preferably, each pin extends entirely across the track and has its end faces disposed within the aperture 85 in the outermost bosses 82—82, 83—83 carried by the narrow track sections 76, 77. Each of the bores in these end bosses is provided with an annular enlargement or groove 86, in which a circular or G-shaped expansible spring clip 87 is disposed. The spring clips are held firmly in the grooves 86 by their resilient expanding tendency and, in Figures 4 and 5, the clips are shown in somewhat contracted position, so that they constantly exert an expanding force against the bottoms of the grooves. The clips are disposed in abutting relation to the end faces of the pins 84, to prevent endwise movement thereof. Hence, even if the pins should be broken intermediate their ends, they would not be dislodged from operative position in the bores, and they would still perform their connecting function and the endless track, as a whole, would not be broken.

Each full width track section 75 has formed on its upper or inner surface a longitudinally arranged upwardly projecting fin 88, merging at its front and rear ends with the central bosses 80, 81. The fins are preferably generally triangular in outline, as shown in Figure 2, and have edges 89, 90 aligned with and adapted to engage the rollers 51 carried by the sprocket, as the fins approach the sprocket periphery and enter the groove therein. The lateral enlargement of the groove and the bevelled surfaces thereof serve to guide the fins into the slot and prevent the ends of the fins from jamming against the periphery of the rim, in case the track sections are tipped laterally a slight amount.

The laterally projecting wings are positioned opposite to the full width sections 75 and provide seats for those sections, as well as preventing lateral tipping thereof, as the track moves around with the sprocket.

The bosses 48, and the rollers 51 enter the apertures 78 and engage bosses 80, 81 in driving relation, the latter acting as bearing surfaces for the rollers.

The track sections 75, 76, 77 are preferably cast or forged from hard, nickel-chrome steel and the fins 88 are preferably formed integrally with the sections 75, by forging or casting. The pins 84 are made of similar material and, in actual practice, it has been demonstrated that, with the construction shown herein, no lubrication of the parts is required, even for extended usage.

If one or more links of the chain become damaged, it is an extremely simple matter to replace the same by the removal of the necessary spring clips 87 and by driving out the connecting pins 84. Thus, the spring clips 87 have numerous advantages and perform unexpected functions when employed in the manner shown herein. First, they prevent endwise removal of the pins in the event that the pins become broken in use. Second, they are relatively inaccessible and are completely protected from mutilation or damage by the enclosing bosses in which they are housed. Third, they may be readily removed by the use of a simple tool in the hands of a mechanic or soldier, for replacement of a pin or track section. Finally, they may be replaced with equal facility, so that repairs to the track can be made in the field with little or no trouble.

It must be understood that the invention is not limited to the specific details of construction shown in the accompanying drawing and described above, but covers all modifications coming within the scope of the appended claims and their equivalents.

I claim:

1. A tank or tractor track comprising a series of sections having transversely spaced apertured bosses on their end edges, the sections being assembled with the bosses on each section intermeshing with those on the adjacent sections and with the apertures in each set of intermeshing bosses of adjacent sections in alignment, the apertures in the end bosses of each set having circumferentially continuous grooves in their sidewalls, a pin extending through each set of aligned apertures, and an expansible spring element confined in the grooves in the outermost apertures of each set of bosses in abutting relation to the ends of the pin, to prevent endwise removal thereof.

2. A tank or tractor track comprising a series of sections having transversely spaced apertured bosses on their end edges, the sections being assembled with the bosses on each section intermeshing with those on the adjacent sections and with the apertures in each set of intermeshing bosses of adjacent sections in alignment, the laterally outermost bosses of each set having enlarged recesses associated with their apertures, a pin extending through each set of aligned apertures, and an expansible spring clip confined in each of said recesses in abutting relation to the opposite ends of the associated pin, to prevent endwise removal thereof.

3. In a tank or tractor track comprising a series of articulated sections each having a plurality of apertured bosses on its end edges disposed in intermeshing, transversely aligned relation with the bosses on the adjacent sections and a hinge pin disposed in the apertures in the bosses and connecting each section to the next, the improved means for preventing accidental removal of the pins, which comprise a circumferentially continuous laterally enlarged recess in the aperture in each of the outermost bosses of each set of intermeshing bosses and a substantially circular spring clip seated in each recess and each having a portion engageable with the adjacent end face of the hinge pin, to prevent endwise removal thereof through the aperture in either of the outermost bosses of each set.

4. In a tank or tractor track comprising a series of articulated sections each having a plurality of apertured bosses on its end edges disposed in intermeshing, transversely aligned relation with the bosses on the adjacent sections and a hinge pin disposed in the apertures in the bosses and connecting each section to the next, the improved means for preventing accidental removal of the pins, which comprise a laterally enlarged annular recess in the aperture in one of the outermost bosses of each set of intermeshing bosses and a G-shaped spring clip seated in each recess and having a portion engageable with the end face of the hinge pin, to prevent endwise removal thereof through the aperture in the last-mentioned boss.

5. A tractor track comprising a line of sections having a plurality of interfitting apertured bosses projecting forwardly and rearwardly from their corresponding edges, a single pin extending through the apertures in each set of interfitting bosses with its end faces disposed within the apertures in the outermost bosses at opposite sides of the track, the aperture in each of the last-mentioned bosses having a continuous circumferential groove formed therein, and an expansible spring clip seated under spring pressure in each groove and having a portion engaging the end face of the pin, to prevent endwise removal thereof from the bosses.

WILLIAM J. BIGLEY, Jr.